Dec. 15, 1970  A. RIVERA ET AL  3,548,373
THEFT PREVENTING SYSTEM FOR VEHICLES
Filed July 28, 1967  2 Sheets-Sheet 1

Aureo Rivera
Aureo E. Rivera
INVENTORS

BY Clarence A. O'Brien
and Harvey B. Jacobson
Attorneys

Dec. 15, 1970  A. RIVERA ET AL  3,548,373
THEFT PREVENTING SYSTEM FOR VEHICLES
Filed July 28, 1967  2 Sheets-Sheet 2
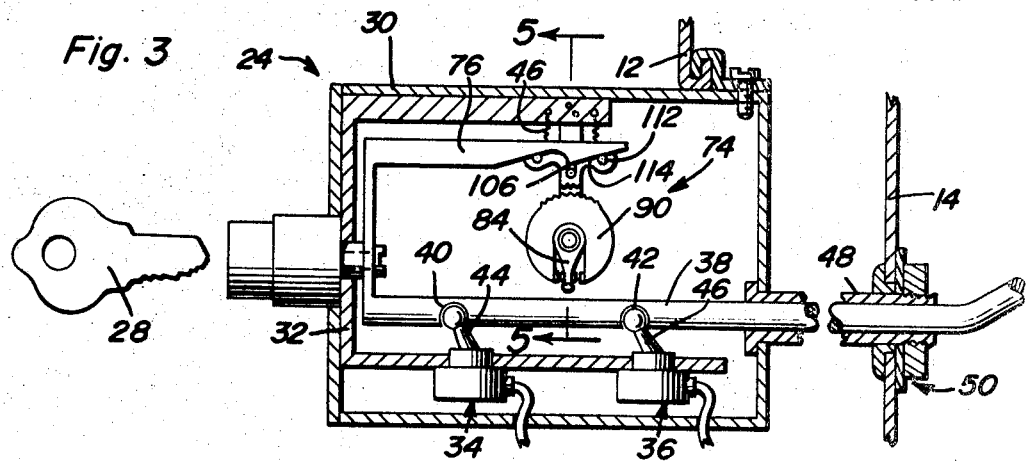
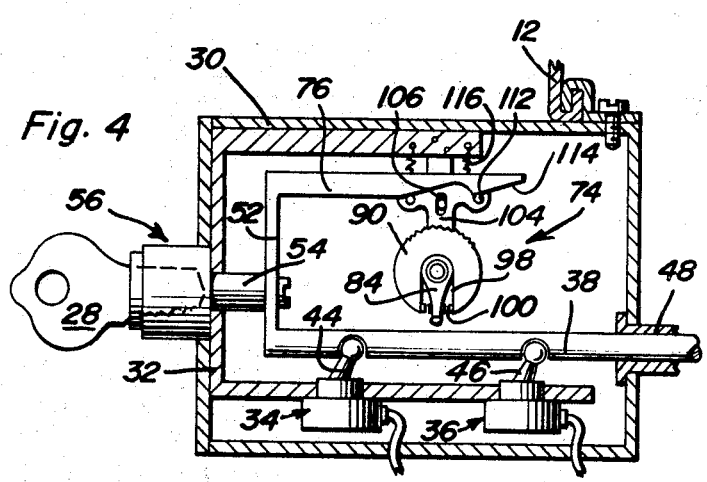
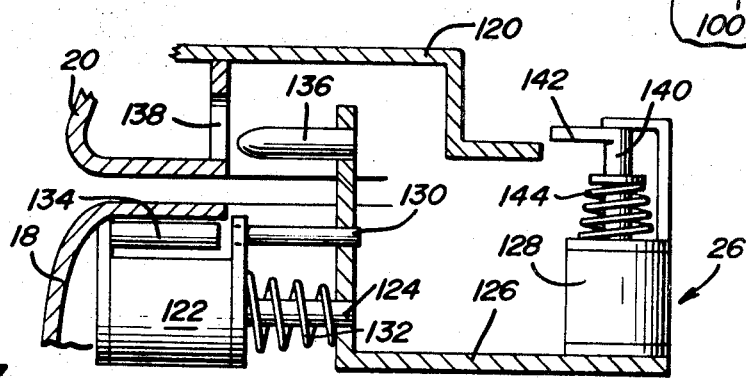
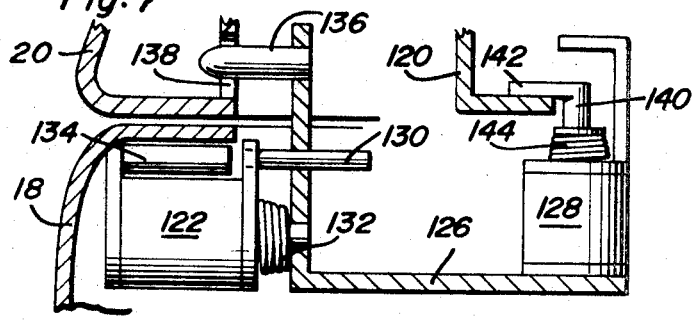
Aureo Rivera
Aureo E. Rivera
INVENTORS
BY *Lawrence A. O'Brien*
*and Harvey B. Jacobson*
Attorneys 3,548,373
THEFT PREVENTING SYSTEM FOR VEHICLES
Aureo Rivera, Morovis, and Aureo E. Rivera, Bayamon,
Puerto Rico (both of P.O. Box 1306, Bayamon, Puerto
Rico 00619)
Filed July 28, 1967, Ser. No. 656,802
Int. Cl. B60r 25/00; G08b 13/00
U.S. Cl. 340—64                                    15 Claims

ABSTRACT OF THE DISCLOSURE

A lock device that is key operated from the dash panel of an automotive vehicle locks the hood to permit shut-down of the engine. In the lock position, the ignition circuit is opened to prevent unauthorized starting of the engine and a trunk protective circuit made operative. Also, an alarm circuit is conditioned for operation in the open position of the lock, includes a pendulum switch to sound the vehicle horn should the vehicle be moved.

BACKGROUND OF THE INVENTION

This invention relates to the protection of automotive vehicles against theft and more particularly to a complete theft discouraging system for preventing the starting of the vehicle engine, tampering with the engine, opening of the storage compartment and establishing an audible alarm should any attempt be made to move the vehicle in an unauthorized manner.

Various proposals have heretofore been made for installing theft preventing devices in automotive vehicles including ignition locks, unauthorized motion sensing alarms, compartment locks, unauthorized entry alarms, etc. The use of any single theft preventing device of the aforementioned types in an automotive vehicle could not possibly provide the over-all protection desired because of the limited function associated with each device. On the other hand, the installation of many different theft preventing devices, each performing a different function, would involve substantial expense and a drain on the source of electrical energy associated with the vehicle for operation thereof.

A theft preventing system capable of performing several diverse functions without interference with each other and without excessive drain of the electrical power source would therefore be very desirable because of the more complete protection that would be provided against the vehicle theft. The provision of such an integrated system presents of course a problem with regard to operator control and installation. Further, to be effective the theft protecting system must avoid unintentional operation and so arranged as to preclude being overlooked by the vehicle operator when leaving the vehicle unattended.

SUMMARY OF THE INVENTION

In accordance with the present invention, a theft preventing system for automotive vehicles is provided performing a plurality of diverse functions in order to prevent unauthorized starting of the vehicle engine and opening of vehicle storage compartment as well as to establish an alarm should any attempt be made to move the vehicle in an unauthorized manner. Further, the system will prevent shut-down of the engine should the vehicle operator forget to arm the theft preventing system when leaving the vehicle.

The theft preventing system is controlled by means of a key operated lock device from the control panel of the vehicle. Thus, when leaving the vehicle, the vehicle operator mechanically locks the hood to prevent tampering with the engine. In the response to such locking of the hood, a trunk protection circuit is rendered operative and the ignition circuit disabled. Also, an alarm circuit is rendered operative so as to sense any unauthorized disturbance of the vehicle and sound the vehicle horn in such an eventuality.

The trunk protection circuit aforementioned is activated in response to attempted opening of the trunk lid whereby after a predetermined delay period, a power operated device is energized to close the trunk lid, the circuit being deactivated only upon successful re-closing of the trunk lid so as to avoid unnecessary and excessive drain of electrical energy from the source of current associated with the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 3 is an enlarged side sectional view through the dash panel mounted component of the theft preventing system.

FIG. 4 is a side sectional view similar to FIG. 3 showing the dash mounted component in a locked position.

FIG. 5 is a partial sectional view taken substantially through a plane indicated by section line 5—5 in FIG. 3.

FIG. 6 is an enlarged side sectional view through the trunk mounted components of the theft preventing system.

FIG. 7 is a side sectional view similar to FIG. 6 showing the trunk mounted component in another operational phase.

DESCRIPTION OF THE PREFERRED EMBODIMENT

Figure 1:
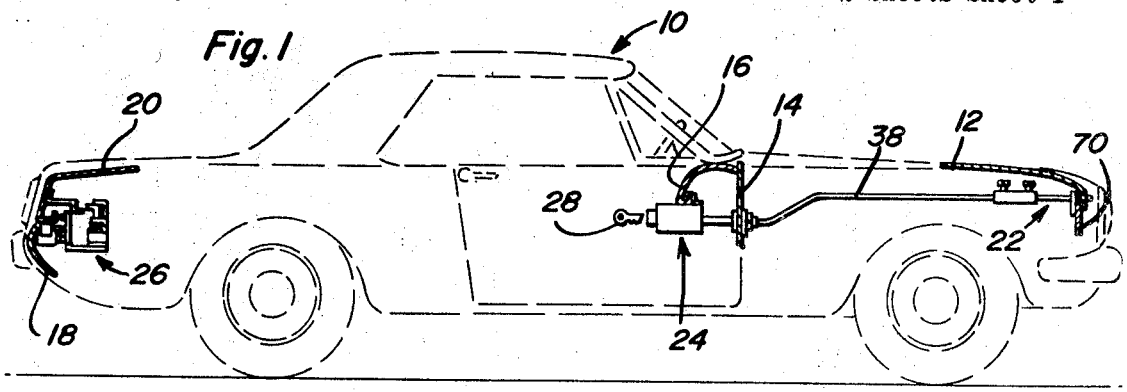
FIG. 1 is a side elevational view of a typical automotive vehicle installation for the theft preventing system of the present invention.

Referring now to the drawings in detail, FIG. 1 illustrates in dotted line, a typical automotive vehicle generally denoted by reference numeral 10 within which the theft preventing system is installed. The vehicle includes an engine compartment adapted to be closed by the front hood 12 disposed forwardly of a fire wall 14 from which the dash panel 16 extends rearwardly into the passenger compartment. A rear storage or trunk compartment 18 is associated with the vehicle for example and is adapted to be closed by a trunk lid 20. The theft preventing system is therefore operative to disable the vehicle engine ignition circuit and lock the hood 12 in its closed position by means of a hood lock 22 under control of the vehicle operator through a key operated control lock assembly 24 mounted on the dash panel 16 within the passenger compartment. A trunk mounted component 26 is also under control of the key-operated control lock assembly 24 for preventing unauthorized opening of the trunk closure lid 20. Thus, when the vehicle operator is ready to leave the vehicle unattended, a key 28 is inserted into the control lock assembly 24 so as to mechanically lock the hood through the hood lock 22, disable the ignition circuit and shut down the engine, render the trunk protection component 26 operative and condition an alarm circuit for operation as will hereafter be explained.

Referring now to FIG. 3, it will be observed that the control assembly 24 is enclosed within a housing 30 suspended from the dash panel 12 in rearwardly spaced relation to the fire wall 14. A mounting bracket 32 is fixedly secured to the housing internally thereof so as to mount a pair of two-position switch assemblies 34 and 36 in longitudinally spaced relation to each other below an actuating rod 38 having sockets 40 and 42 formed therein receiving the switch actuators 44 and 46 respectively associated with the switch assemblies 34 and 36. The actuating rod 38 is slidably mounted within the housing 30 by means of a guide sleeve 48 extending from the housing 30 to the fire wall 14. The guide sleeve 48 is fixed to the fire wall by means of the mounting assembly 50 for this purpose. The actuating rod is displaceable from a release position shown in FIG. 3 to a lock position shown in FIG. 4 in order to displace the switch actuators 44 and 46 from one operative position to another. The rear end portion 52 of the actuating rod is accordingly connected to the actuating plunger 54 associated with a tumbler type lock device 56 into which the key 28 is adapted to be inserted. It will be apparent therefore, that upon insertion of the proper key 28 into the tumbler lock device 56 and rotation thereof, the key 28 may be pushed inwardly displacing the plunger 54 and the actuating rod 38 to which it is connected.

Figure 8:
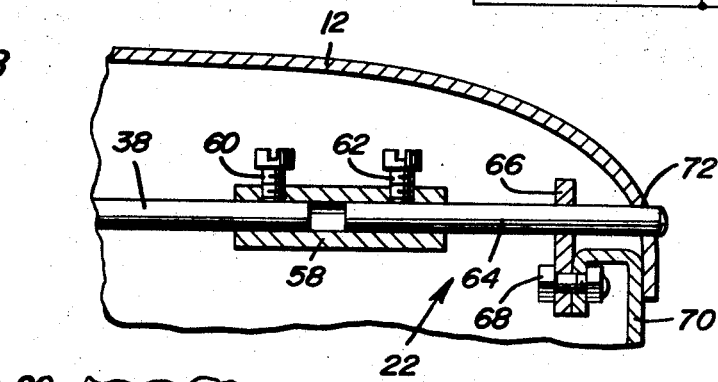
FIG. 8 is an enlarged side sectional view of the hood lock component associated with the system.

The actuating rod 38 extends upwardly beyond the fire wall 14 within the engine compartment and as shown in FIG. 8 is connected by means of a sleeve 58 and a pair of setscrews 60 and 62 to a lock plunger 64. The lock plunger 64 extends through an aperture in a guide plate 66 secured by the fastener 68 to a support member 70 associated with the vehicle engine compartment over which hood 12 extends. An opening 72 is accordingly formed in the hood for receiving the lock plunger 64 when the actuating rod 38 to which it is connected is displaced forwardly to the lock position.

The actuating rod 38 when displaced from the released position to the lock position also actuates the switch assembly 34 through which the ignition circuit is disabled. The switch assembly 36 which is simultaneously actuated, constitutes a circuit completing switch for the trunk mounted component 26 to which it is electrically connected. Forward displacement of the actuating rod by means of the key operated lock device 56 also renders an alarm circuit operative through a vibration sensing switch assembly generally referred to by reference numeral 74 mounted within the housing 30. The vibration sensing switch assembly is suspended from the bracket 32 and is adapted to be placed in an operative condition by means of an actuating arm 76 connected to the rear end 52 of the actuating rod as shown in FIGS. 3 and 4.

The vibration sensing switch assembly 74 as more clearly seen in FIGS. 3 and 5, includes a conductive mounting element 78 fixedly secured in non-conductive relation to the bracket 32 from which it is spaced by means of the insulating spacer 80. A conductive pivot pin 82 is secured to the mounting element 78 for rotatably mounting about a pivotal axis, a pendulum contact member 84. Thus, an electrical connection is established from the pendulum contact member through the pivot pin 82 and the mounting element 78 to conductor 86 electrically connected to the mounting element by means of the terminal post 88 for completing the alarm circuit when the pendulum contact member engages a conductive disk member 90. The disk member 90 is also rotatably mounted on the pivot pin 82 by means of a bearing sleeve 92 disposed however within a non-conductive sleeve 94 so as to maintain the disk member 90 electrically insulated from the pivot pin and the mounting element. A non-conductive spacer 96 also separates the conductive disk member 90 from the pendulum contact member 84. The conductive disk member 90 is wider at the bottom so as to form a slot 98 presenting contacts 100 on opposite sides of the pendulum contact member 84 adapted to be engaged by the pendulum contact member in response to movement of the contact member relative to the disk member 90. Both the pendulum contact member and the disk member 90 are ordinarily freely rotatable on the pivot pin 82 when the switch assembly 74 is inoperative and insensitive. However when the disk member 90 is held stationary relative to the mounting element 78, the pendulum contact member is operative to engage the contacts 100 in response to any movement or disturbance of the vehicle.

An upper arcuate portion of the conductive disk member 90 is provided with teeth or serrations 102 adapted to be engaged by corresponding teeth on a conductive engaging element 104 slidably mounted in non-conductive relation on the mounting element 78. A guide slot 106 is accordingly formed in the engaging element adapted to receive a guide pin 108 having a non-conductive sleeve 110 thereon. Pins 112 project from the engaging element on opposite lateral sides of the guide slot 106 and are adapted to be engaged by the cam surface 114 formed on the actuating arm 76 so as to downwardly urge the engaging element 104 into engagement with the conductive disk member 90 against the bias of the springs 116 suspending the engaging element above the disk member 90. Thus, when the engaging element is displaced into engagement with the disk member 90, it renders the vibration sensing switch assembly 74 operative by holding the disk member stationary and establishing a ground connection thereto through the springs 116 and the bracket 32 to which the springs are anchored. The alarm circuit is accordingly completed as will be hereafter explained when contact is established between the pendulum contact member 84 and the contacts 100 on the conductive disk member 90.

Figure 9:
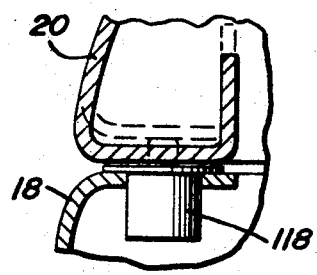
FIG. 9 is a partial side sectional view of another portion of the trunk mounted component associated with the system.

Referring now to FIGS. 6, 7 and 9, it will be observed that the trunk mounted component 26 includes a sensing switch 118 adapted to be held open by the trunk lid 20 in its closed position as illustrated in FIG. 9, the switch 118 being biased to a closed position when the trunk lid is slightly opened as shown by dotted line in FIG. 9. Fixedly mounted within the trunk below the ledge 120 of the trunk lid, as shown in FIGS. 6 and 7, is an actuator solenoid device 122 having an armature 124 connected to a mounting bracket 126 on which a power operated solenoid device 128 is carried. A guide pin 130 extends from the stationary solenoid device 122 to guide slidable movement of the mounting bracket 126 against the bias of a spring 132. It will be apparent therefore, that upon energization of the actuator solenoid device 122, the mounting bracket 126 is displaced from the position shown in FIG. 6 to the position shown in FIG. 7 operatively positioning the power operated solenoid device 128 relative to the ledge 120 of the trunk lid. Also fixedly mounted adjacent to the solenoid device 122, is a thermal delay switch 134 for controlling energization of the power operated solenoid device 128 as will be hereafter explained.

Connected to the mounting bracket 126 is a limit pin 136 adapted to be received within the opening 138 formed in the trunk lid 20 so as to limit opening thereof. The bracket 126 on which the power operated solenoid device 128 is mounted also positions the armature 140 associated therewith so that the actuator arm 142 extending therefrom overlies the trunk lid ledge 120 as shown in FIG. 7. Energization of the solenoid device 128 accordingly downwardly displaces the actuating arm 142 against the bias of the return spring 144 to close the trunk lid as shown in FIG. 7. The solenoid device 128 is of course so operative only when it is displaced to an operative position by energization of the actuator solenoid device 122.

The trunk mounted component 26 could if desired be adapted for installation in other compartments of the vehicle to prevent unauthorized opening of the closure members associated therewith such as the doors to the passage compartment.

Figure 2:
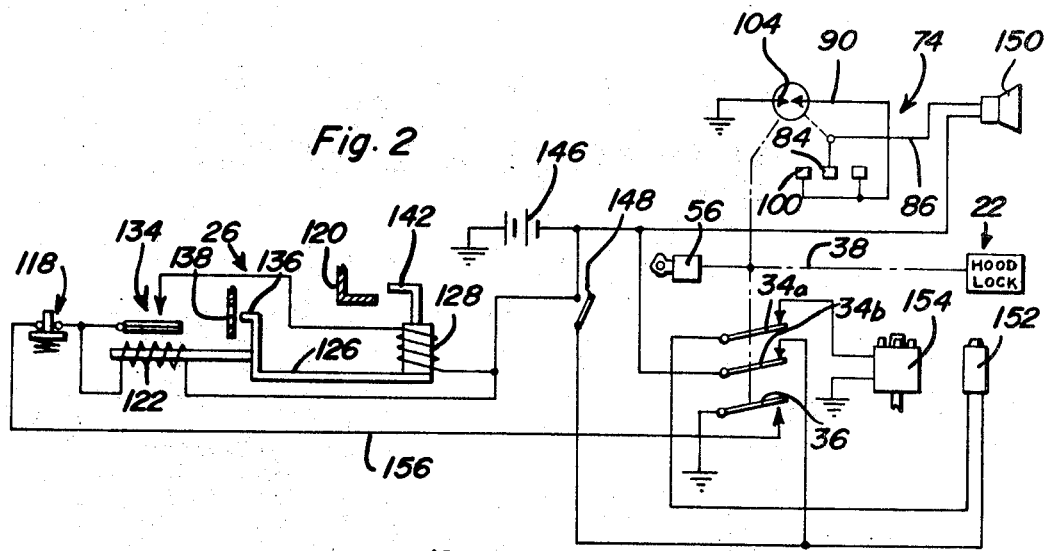
FIG. 2 is an electrical circuit diagram associated with the theft preventing system.

All of the components as hereinbefore described, are electrically interrelated as shown by the electrical circuit diagram of FIG. 2. With the actuating rod 38 in the release position, the switches occupy the positions illustrated. Electrical energy may be derived from a source of current such as the vehicle battery 146 having a grounded terminal and an output terminal connected to the open contact of the usual vehicle ignition switch 148. The battery is also connected to one terminal of the vehicle horn 150 and to terminals of the power operated solenoid device 128 and the actuator solenoid device 122. Also, the vehicle battery is connected to the ignition bypass switch section 34b. Thus, an electrical connection is established from the power output terminal of the battery through the closed switch section 34b to the igntion coil 152 which in turn is electrically connected through the closed disabling switch section 34a to the grounded distributor 154. The switch assembly 34 in the closed position illustrated permits operation of the vehicle while the switch assembly 36 is in the open position preventing operation of the protection circuit associated with the trunk mounted component 26.

If the vehicle operator intends to leave the vehicle, unless the actuating rod 38 is displaced to the lock position engaging the hook lock 22, shut-down of the vehicle engine will not occur upon opening of the ignition switch 148 inasmuch as the by-pass switch section 34b will maintain the ignition circuit complete. On the other hand, displacement of the actuating rod 38 to the lock position not only opens the by-pass switch section 34b but also opens the disabling switch section 34a so that the ignition circuit cannot be closed by some unauthorized by-pass of the igntion switch 148. At the same time, the circuit completing switch assembly 36 is closed establishing a ground connection through conductor 156 to the closure sensing switch 118 connected in series with the actuator solenoid device 122 to the output terminal of the battery 146. As hereinbefore indicated, the sensing switch 118 is held open against a spring bias by the trunk lid in its closed position so as to prevent energization of the solenoid device 122 even when the circuit is conditioned by closing of the switch assembly 36. However, should any attempt be made to open the trunk after the actuating rod 38 is in its lock position, the sensing switch 118 closes to complete an energizing circuit for the actuator solenoid device 122. Upon energization of the solenoid device 122, the mounting bracket 126 is displaced so that the limit pin 136 enters the opening 138 to limit further opening of the trunk lid while the actuating arm 142 associated with the power operated solenoid device 128 is positioned over the trunk lid ledge 120. The flow of current through the actuator solenoid device 122 heats the thermal delay switch 134 so that after a predetermined delay period, it closes its contacts in order to complete an energizing circuit through the power operated solenoid device 128. Energization of the power operated solenoid device then downwardly displaces the trunk lid to its closed position opening the sensing switch 118 to thereby interrupt the circuit. It will be apparent therefore, that the thermal delay switch 134 not only prevents overheating of the actuator solenoid device 122 but also effects closing of the trunk lid. If the trunk lid remains closed following energization of the power operated solenoid device 128, the circuit remains open so as to avoid any unnecessary drain of current from the battery.

When the actuating rod 38 is displaced to its lock position, the vibration sensing switch assembly 74 is rendered operative as hereinbefore indicated completing a ground connection to the contacts 100 with which the pendulum contact member 84 is engageable in response to movement of the vehicle. The pendulum contact member is electrically connected through the conductor 86 to the vehicle horn 150 in order to complete an energizing circuit therethrough whenever electrical contact is established between the pendulum contact member and the contacts 100. It will be apparent therefore, that when the vibration sensing switch assembly 74 is rendered operative, the horn 150 will be sounded in response to disturbance or motion of the vehicle. Complete protection for the vehicle against theft is thereby provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position.

2. The combination of claim 1 including by-pass switch means operatively connected to the lock means in by-pass relation to the ignition switch for preventing shut-down of the engine until the lock means is in the lock position.

3. The combination of claim 2 including a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member.

4. The combination of claim 3 wherein said closure protecting circuit includes a solenoid actuator connected to the power operated means for movement thereof to an operative position, a circuit completing switch closed by the lock means in the lock position thereof, and means connecting the solenoid actuator to the source of current in series with said circuit completing switch.

5. The combination of claim 4 wherein said closure sensing means includes a closure switch held open by the closure member in the closed position thereof connected in series with the circuit completing switch and the solenoid actuator, and limit means engageable with the closure member for limiting said opening movement of the closure member in response to energization of the solenoid actuator.

6. The combination of claim 5 wherein said power operated means comprises a closure engaging solenoid mounted by the solenoid actuator and connected to the source of current, and delay means connecting the closure sensing means to the closure engaging solenoid for energization thereof in delayed response to energization of the solenoid actuator.

7. The combination of claim 6 including an alarm circuit, means responsive to displacement of the lock means to the release position for disabling the alarm circuit during operation of the engine, and vibration sensing means connected to the alarm circuit for operation thereof in response to movement of the vehicle while the lock means is in the lock position.

8. The combination of claim 7 wherein said means for disabling the alarm circuit includes, a conductive mounting element for the vibration sensing means, a spring-biased engaging element movably mounted in non-conductive relation on the mounting element, and means connected to the lock means for displacing the engaging element into contact with the vibration sensing means.

9. The combination of claim 1 including a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member.

10. The combination of claim 9 including an alarm circuit, means responsive to displacement of the lock means to the release position for disabling the alarm circuit during operation of the engine, and vibration sensing means connected to the alarm circuit for operation thereof in response to movement of the vehicle while the lock means is in the lock position.

11. The combination of claim 1 including an alarm circuit, means response to displacement of the lock means to the release position for disabling the alarm circuit during operation of the engine, and vibration sensing means connected to the alarm circuit for operation thereof in response to movement of the vehicle while the lock means is in the lock position.

12. The combination of claim 11 wherein said means for disabling the alarm circuit includes, a conductive mounting element for the vibration sensing means, a spring-biased engaging element movably mounted in non-conductive relation on the mounting element, and means connected to the lock means for displacing the engaging element into contact with the vibration sensing means.

13. A protection circuit for a compartment having a closure member comprising power operated means moved to an operative position for displacing the closure member to a closed position, a solenoid actuator mounting the power operated means for movement thereof to said operative position, means connecting the solenoid actuator and the power operated means to a source of current, a circuit completing sensing switch held open by the closure member in the closed position thereof and connected in series with the solenoid actuator for energization thereof upon opening of the closure member, limit means engageable with the closure member in response to energization of the solenoid actuator for limiting opening of the closure member and delay means connecting the power operated means to the sensing switch for energization of the power operated means in delayed response to energization of the solenoid actuator moving the power operated means to said operative position.

14. In combination with a vehicle having an engine, an ignition switch mechanism and a compartment closure, a theft prevention system including mechanical locking means displaceable from an open to a closed position independently of the ignition switch mechanism for locking the closure, an alarm device, means for arming the alarm device in response to displacement of the locking means to the open position, and means for preventing shutdown of the engine by opening of the ignition switch mechanism while the locking means is in said open position.

15. The combination of claim 14 wherein said alarm device includes a displaceable contact member and said arming means includes a holding element engageable with the contact member to prevent displacement thereof.

References Cited
UNITED STATES PATENTS

| | | | |
|---|---|---|---|
| 1,568,509 | 1/1926 | Kolling et al. | 340—64 |
| 1,720,230 | 7/1929 | Murray | 340—64 |
| 2,000,136 | 5/1935 | Huss | 340—64 |
| 2,385,285 | 9/1945 | Kolias | 340—64 |
| 3,242,460 | 3/1966 | Morrell | 340—64 |

ALVIN H. WARING, Primary Examiner

H. S. COHEN, Assistant Examiner

U.S. Cl. X.R.
180—112; 340—63

REEXAMINATION CERTIFICATE (615th)
United States Patent
[11] B1 3,548,373

Rivera et al.

[45] Certificate Issued  Jan. 6, 1987

[54] THEFT PREVENTING SYSTEM FOR VEHICLES

[76] Inventors: Aureo Rivera; Aureo E. Rivera, both of P.O. Box 1306, Bayamon, P.R. 00619

Reexamination Request:
No. 90/000,755, Apr. 10, 1985

Reexamination Certificate for:
Patent No.: 3,548,373
Issued: Dec. 15, 1970
Appl. No.: 656,802
Filed: Jul. 28, 1967

[51] Int. Cl.⁴ .................. B60R 25/04; G08B 13/00; B60R 25/00
[52] U.S. Cl. .................................. 340/64; 340/63; 180/287; 70/241; 307/10 AT
[58] Field of Search .................... 340/63–65; 180/173, 287; 307/10 AT; 70/237, 239–241

[56] References Cited

U.S. PATENT DOCUMENTS

| | | | |
|---|---|---|---|
| 868,693 | 10/1907 | Ottinger | 70/241 |
| 1,481,498 | 1/1924 | Boggess | 70/241 |
| 1,519,904 | 12/1924 | Cummings | 70/241 |
| 1,755,070 | 4/1930 | Mauborgne | 180/287 |
| 1,825,413 | 9/1931 | Norviel | 70/241 |
| 2,366,391 | 1/1945 | Dodge | 70/239 |
| 2,637,789 | 5/1953 | Critchfield et al. | 70/241 |
| 2,718,776 | 9/1955 | Moore | 70/241 |
| 2,819,770 | 1/1958 | Gibbs | 180/82 |
| 3,282,369 | 11/1966 | Pangborn | 180/82 |

FOREIGN PATENT DOCUMENTS 232939  4/1926  United Kingdom ................. 180/82

*Primary Examiner*—Donnie L. Crosland

[57] ABSTRACT

A lock device that is key operated from the dash panel of an automotive vehicle locks the hood to permit shutdown of the engine. In the lock position, the ignition circuit is opened to prevent unauthorized starting of the engine and a trunk protective circuit made operative. Also, an alarm circuit is conditioned for operation in the [open] *lock* position of the lock, [includes] *including* a pendulum switch to sound the vehicle horn should the vehicle be moved.

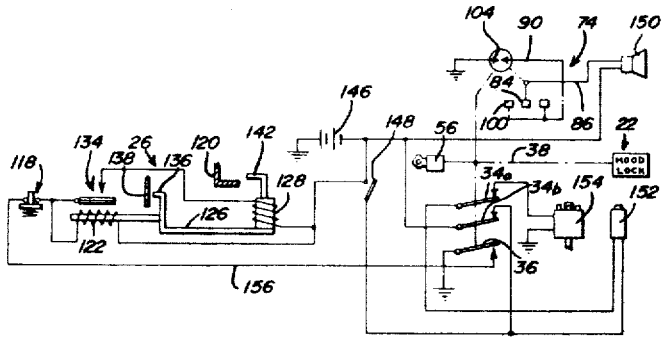

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 13 is confirmed.

Claim 1 is cancelled.

Claims 2-12, 14 and 15 are determined to be patentable as amended.

2. [The combination of claim 1] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position.*

3. [The combination of claim 2] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position, said system* [including] *includes* a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member.

4. [The combination of claim 3 wherein] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position, said system includes a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member,* said closure protecting circuit includes a solenoid actuator connected to the power operated means for movement thereof to an operative position, a circuit completing switch closed by the lock means in the lock position thereof, and means connecting the solenoid actuator to the source of current in series with said circuit completing switch.

5. [The combination of claim 4 wherein] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position, said system includes a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member,* said closure sensing means includes a closure switch held open by the closure member in the closed position thereof connected in series with the circuit completing switch and the solenoid actuator, and limit means engageable with the closure member for limiting said opening movement of the closure member in response to energization of the solenoid actuator.

6. [The combination of claim 5 wherein] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position, said system includes a closure protecting* circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member, said closure sensing means includes a closure switch held open by the closure member in the closed position thereof connected in series with the circuit completing switch and the solenoid actuator, and limit means engageable with the closure member for limiting said opening movement of the closure member in response to energization of the solenoid actuator, said power operated means comprises a closure engaging solenoid mounted by the solenoid actuator and connected to the source of current, and delay means connecting the closure sensing means to the closure engaging solenoid for energization thereof in delayed response to energization of the solenoid actuator.

7. [The combination of claim 6] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position, said system includes a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member, said closure sensing means includes a closure switch held open by the closure member in the closed position thereof connected in series with the circuit completing switch and the solenoid actuator, and limit means engageable with the closure member for limiting said opening movement of the closure member in response to energization of the solenoid actuator, said power operated means comprises a closure engaging solenoid mounted by the solenoid actuator and connected to the source of current, and delay means connecting the closure sensing means to the closure engaging solenoid for energization thereof in delayed response to energization of the solenoid actuator, said system also [including] includes an alarm circuit, means responsive to displacement of the lock means to the release position for disabling the alarm circuit during operation of the engine, and vibration sensing means connected to the alarm circuit for operation thereof in response to movement of the vehicle while the lock means is in the lock position.*

8. [The combination of claim 7 wherein] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including by-pass switch means operatively connected to the lock means in by-pass relation to the ignition switch for preventing shut-down of the engine until the lock means is in the lock position, said system includes a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member, said closure sensing means includes a closure switch held open by the closure member in the closed position thereof connected in series with the circuit completing switch and the solenoid actuator, and limit means engageable with the closure member for limiting said opening movement of the closure member in response to energization of the solenoid actuator, said power operated means comprises a closure engaging solenoid mounted by the solenoid actuator and connected to the source of current, and delay means connecting the closure sensing means to the closure engaging solenoid for energization thereof in delayed response to energization of the solenoid actuator, said system also includes an alarm circuit, means responsive to displacement of the lock means to the release position for disabling the alarm circuit during operation of the engine, and vibration sensing means connected to the alarm circuit for operation thereof in response to movement of the vehicle while the lock means is in the lock position,* said means for disabling the alarm circuit includes, a conductive mounting element for the vibration sensing means, a spring-biased engaging element movably mounted in non-conductive relation on the mounting element, and means connected to the lock means for displacing the engaging element into contact with the vibration sensing means.

9. [The combination of claim 1] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, said system* [including] *includes* a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member.

10. [The combination of claim 9 including] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and* disabling switch means connected in series with the ignition switch for opening said ignition circuit in response to displacement of the lock means to the lock position, said system includes a closure protecting circuit, closure sensing means operatively connected to said lock means for rendering the protecting circuit operative in response to displacement of the lock means to the lock position, and power operated means connected to the closure protecting circuit for displacing the closure member to a closed position in response to opening movement of said closure member, an alarm circuit, means responsive to displacement of the lock means to the release position for disabling the alarm circuit during operation of the engine, and vibration sensing means connected to the alarm circuit for operation thereof in response to movement of the vehicle while the lock means is in the lock position.

11. [The combination of claim 1] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position,* including an alarm circuit, means [response] *responsive* to displacement of the lock means to the release position for disabling the alarm circuit during operation of the engine, and vibration sensing means connected to the alarm circuit for operation thereof in response to movement of the vehicle while the lock means is in the lock position.

12. [The combination of claim 11 wherein] *A theft preventing system for a vehicle having a source of current connected by an ignition switch to an ignition circuit for an engine enclosed by a hood within an engine compartment and another compartment adapted to be closed by a closure member, said system including lock means movably mounted within said vehicle for displacement between a release position and a lock position operatively engaging the hood to prevent opening of the engine compartment, and disabling switch means connected in series with the ignition switch for opening said ignition circuit in response to displacement of the lock means to the lock position, including an alarm circuit, means responsive to displacement of the lock means to the release position for disabling the alarm circuit during operation of the engine, and vibration sensing means connected to the alarm circuit for operation thereof in response to movement of the vehicle while the lock means is in the lock position,* said means for disabling the alarm circuit includes, a conductive mounting element for the vibration sensing means, a spring-biased engaging element movably mounted in non-conductive relation on the mounting element, and means connected to the lock means for displacing the engaging element into contact with the vibration sensing means.

14. In combination with a vehicle having an engine, an ignition switch mechanism and a compartment closure, a theft prevention system including mechanical locking means displaceable from an open to a closed position independently of the ignition switch mechanism for locking the closure, an alarm device, means for [arming] *disarming* the alarm device in response to displacement of the locking means to the open position, and means for preventing shutdown of the engine by opening of the ignition switch mechanism while the locking means is in said open position.

15. The combination of claim 14 wherein said alarm device includes a displaceable contact member and said [arming] *disarming* means includes a holding element engageable with the contact member to prevent displacement thereof.

* * * * *